(12) United States Patent
Lou et al.

(10) Patent No.: US 7,855,867 B2
(45) Date of Patent: Dec. 21, 2010

(54) PON TRANSCEIVER WITH A SURGE PROTECTION CIRCUIT

(75) Inventors: Xiaoming Lou, Arcadia, CA (US); Genzao Zhang, Ottawa (CA); Henok Tafese, Cypress (CA); Eric Hufstedler, Pasadena, CA (US)

(73) Assignee: Emcore Corporation, Albuquerque, NM (US)

( * ) Notice: Subject to any disclaimer, the term of this patent is extended or adjusted under 35 U.S.C. 154(b) by 428 days.

(21) Appl. No.: 12/044,665

(22) Filed: Mar. 7, 2008

(65) Prior Publication Data
US 2009/0225488 A1    Sep. 10, 2009

(51) Int. Cl.
*H02H 1/00* (2006.01)
*H02H 1/04* (2006.01)

(52) U.S. Cl. ..................................... 361/119
(58) Field of Classification Search .................. 361/119
See application file for complete search history.

(56) References Cited

U.S. PATENT DOCUMENTS

| | | | | |
|---|---|---|---|---|
| 5,815,359 A | * | 9/1998 | Maytum et al. | 361/111 |
| 5,844,761 A | * | 12/1998 | Place, IV | 361/104 |
| 7,039,329 B2 | * | 5/2006 | Kenny | 398/202 |
| 7,123,463 B2 | * | 10/2006 | Devine et al. | 361/119 |
| 2003/0147601 A1 | * | 8/2003 | Bartur et al. | 385/92 |
| 2007/0291777 A1 | * | 12/2007 | Jamieson et al. | 370/401 |
| 2008/0159744 A1 | * | 7/2008 | Soto et al. | 398/115 |
| 2009/0225488 A1 | * | 9/2009 | Lou et al. | 361/119 |
| 2010/0150556 A1 | * | 6/2010 | Soto et al. | 398/66 |

\* cited by examiner

*Primary Examiner*—Ronald W Leja

(57) ABSTRACT

A passive optical network transceiver including a surge protection circuit so as to protect the electro-optical circuitry from lightning or other electrical surges. The surge protection circuit includes a ground line and at least one capacitor provided in a first line. In particular, the capacitance value of the capacitor is such as to limit the surge current in the first line, and the breakdown voltage of the capacitor is such as to limit the surge voltage between the first line and the ground line. In one embodiment, the surge protection circuit includes a second line connecting the first line to the ground line and at least one inductor provided in the second line. The surge protection circuit may include one capacitor with small value and high voltage rating, and multiple capacitors with larger value and lower voltage rating.

13 Claims, 5 Drawing Sheets

PON TRANSCEIVER WITH A SURGE PROTECTION CIRCUIT

FIELD OF THE INVENTION

The present invention relates to a passive optical network (PON) transceiver with a surge protection circuit.

DESCRIPTION OF THE RELATED ART

Power circuits, digital circuits and especially RF circuits are vulnerable and may be damaged by lightning strike. Lightning protectors have been developed for protecting the above circuits. In particular, RF circuit protection is most challenging for the balance between RF performance and protection effectiveness.

In an RF line, the protection circuit has to be carefully designed so the RF performance will not be affected significantly.

Some techniques have been developed for lightning surge protection of RF circuits.

U.S. Pat. No. 7,123,463 discloses a surge protection circuit for coaxial lines. The circuit comprises an inner conductor with two conductive portions mechanically and capacitively coupled together, and displaced from one another, by a dielectric material which may be injection molded or snapped onto the conductive portions.

U.S. Pat. No. 5,884,761 discloses a device for line card lightning protection having a heat generating fusible resistive element connected to two electrical terminals using controlled-melting temperature solder.

U.S. Pat. No. 5,815,359 discloses a lightning protection device having two distinct protective elements for protecting the equipment from an electrical surge of positive polarity and negative polarity respectively.

Although the techniques disclosed in the above mentioned U.S. patents are effective for protection, the high cost limits their employment, particularly in FTTH PON products where low cost and effective protection with limited effect on RF performance is demanded.

Moreover, it should be noted that PON products, such as PON transceivers, are often employed in a module attached to the exterior of a building, where the exterior electrical RF cabling is particularly susceptible to lightning.

Therefore, there is a need to address the above mentioned drawbacks associated with the known PON transceivers.

SUMMARY

The present invention provides a PON transceiver with a low cost surge protection circuit effectively protecting from lightning surge.

According to one embodiment, the PON transceiver has an optical connection for optical signals, an RF connection for RF signals, an electro-optical circuitry connected to the optical connection, and a surge protection circuit connecting the electro-optical circuitry to the RF connection for protecting the electro-optical circuitry. In particular, the surge protection circuit comprises a first line, connecting the electro-optical circuitry to the RF connection, for conducting an RF signal and a surge signal, a ground line, and at least one capacitor provided in the first line. The capacitance value of the at least one capacitor is such as to limit the surge current in the first line, and its breakdown voltage is such as to limit the surge voltage between the first line and the ground line.

In a preferred embodiment, the surge protection circuit further comprises a second line connecting the first line to the ground line and at least one inductor provided in the second line for providing a path to ground for the surge signal. In particular, the inductance value of the at least one inductor is such as to limit the surge voltage between the first line and the ground line.

In a further preferred embodiment, the at least one capacitor comprises a plurality of series capacitors and the at least one inductor comprises a plurality of series inductors.

These and other features of the present teachings are set forth herein.

Other features and advantages of the present invention will become apparent to the one skilled in the art from the following drawings and description of various embodiments.

BRIEF DESCRIPTION OF THE DRAWINGS

The skilled person will understand that the drawings described below, are for illustration purposive only. The drawings are not intended to limit the scope of the present teachings in any way.

In the following, various embodiments of the invention will be described in detail with reference to the accompanying drawings, in which.

DESCRIPTION OF VARIOUS EMBODIMENTS

Figure 1:
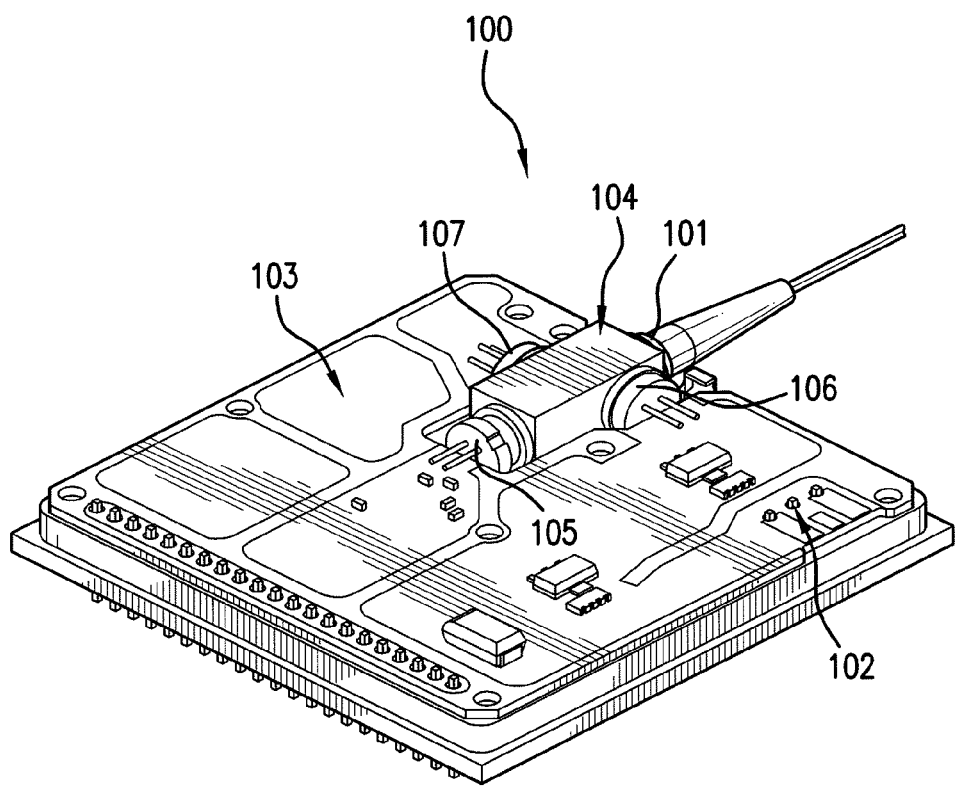
FIG. 1 shows a PON transceiver with a surge protection circuit according to the present invention.
Figure 2:
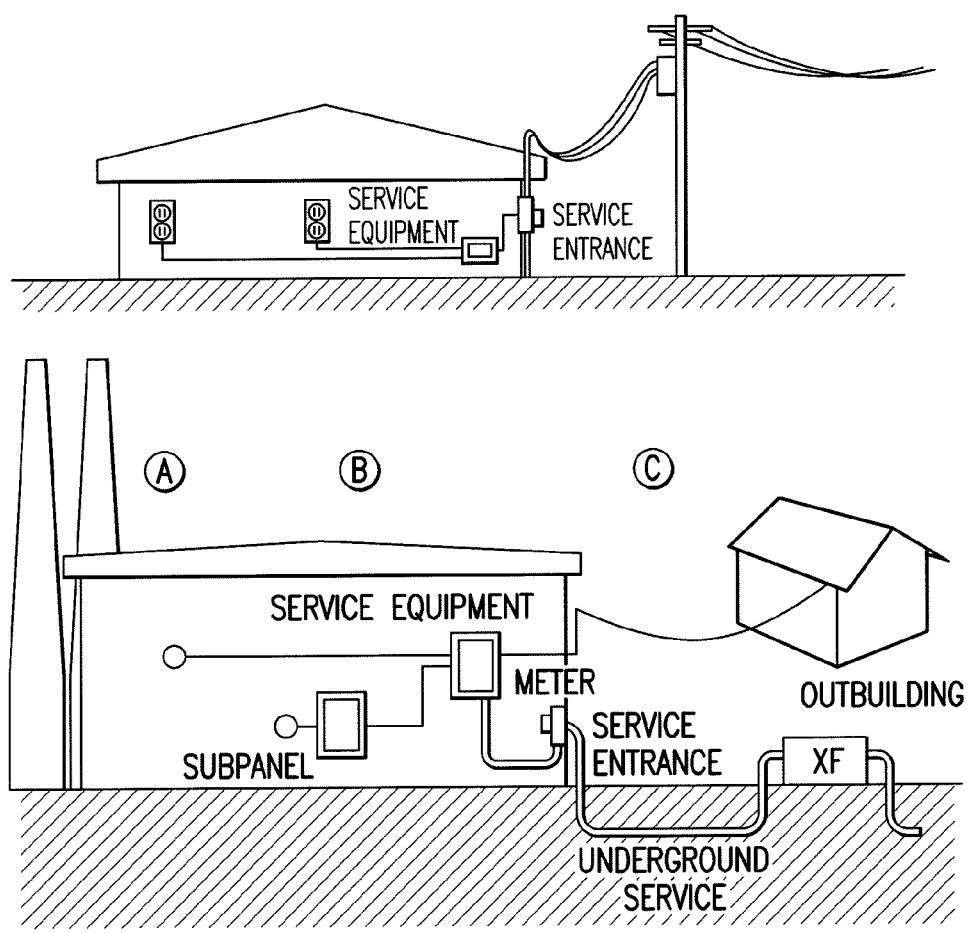
FIG. 2 shows a typical installation of a PON transceiver.

Referring to the attached figures, FIG. 1 shows a schematic diagram of a passive optical network (PON) transceiver 100.

The PON transceiver 100 comprises an optical connection 101 for optical signals, an RF connection 102 for RF signals, an electro-optical circuitry 103 coupled to the optical connection 101 and a surge protection circuit 1.

According to one embodiment, the electro-optical circuitry 103 comprises an optical triplexer 104 for transmitting and receiving video, voice and data content.

According to one embodiment, the optical triplexer 104 comprises an optical transmitter 105 for transmitting an up stream optical signal at a first wavelength, an optical receiver 106 for receiving a down stream optical signal at a second wavelength, and an optical receiver 107 for receiving a video optical signal at a third wavelength.

In particular, the up stream optical transmitter 105 might comprise a DFB laser, the down stream optical receiver might comprise a photodiode, advantageously a high sensitivity avalanche photodiode, and the video optical receiver might comprise a high responsivity PIN photodiode.

According to one embodiment, the first wavelength is 1310 nm, the second wavelength is 1490 nm, and the third wavelength is 1550 nm.

The surge protection circuit 1 of the PON transceiver 100 connects the electro-optical circuitry 103 to the RF connection 102 for protecting the electro-optical circuitry 103 from possible lightning surge coming from the RF connection 102.

In particular, the first line 10 of the surge protection circuit 1 connects the electro-optical circuitry 103 to the RF connection 102.

The surge protection circuit 1 is used to protect the electronic devices of the electro-optical circuitry 103 from lightning surges arising from the RF connection 102.

In the examples shown in the attached figures, the surge protection circuit 1 is connected between an RF port 40, connected to the RF connection 102, and a transistor 41 schematically representing a front-end of the electro-optical circuitry 103.

Figure 3:
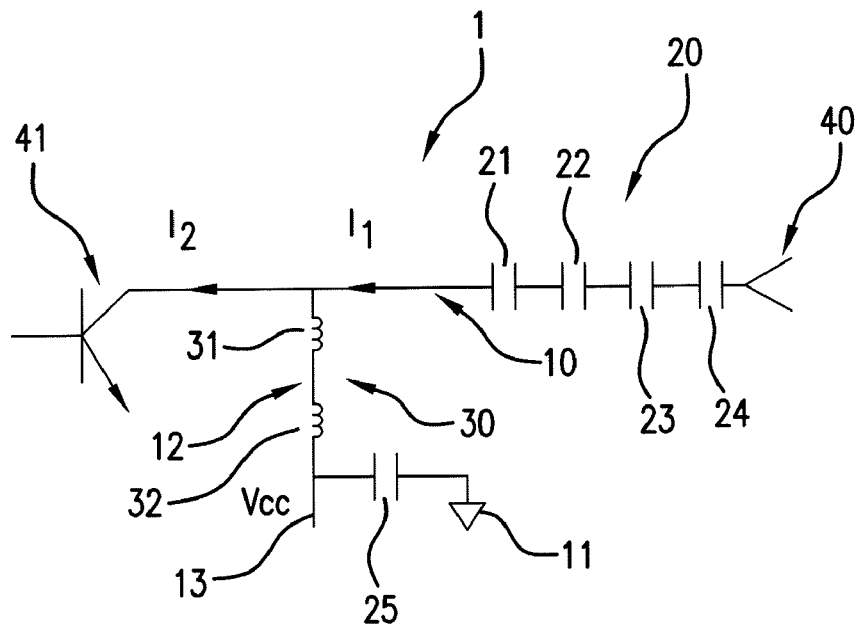
FIG. 3 shows one embodiment of the surge protection circuit of the PON transceiver according to the present invention.
Figure 7:
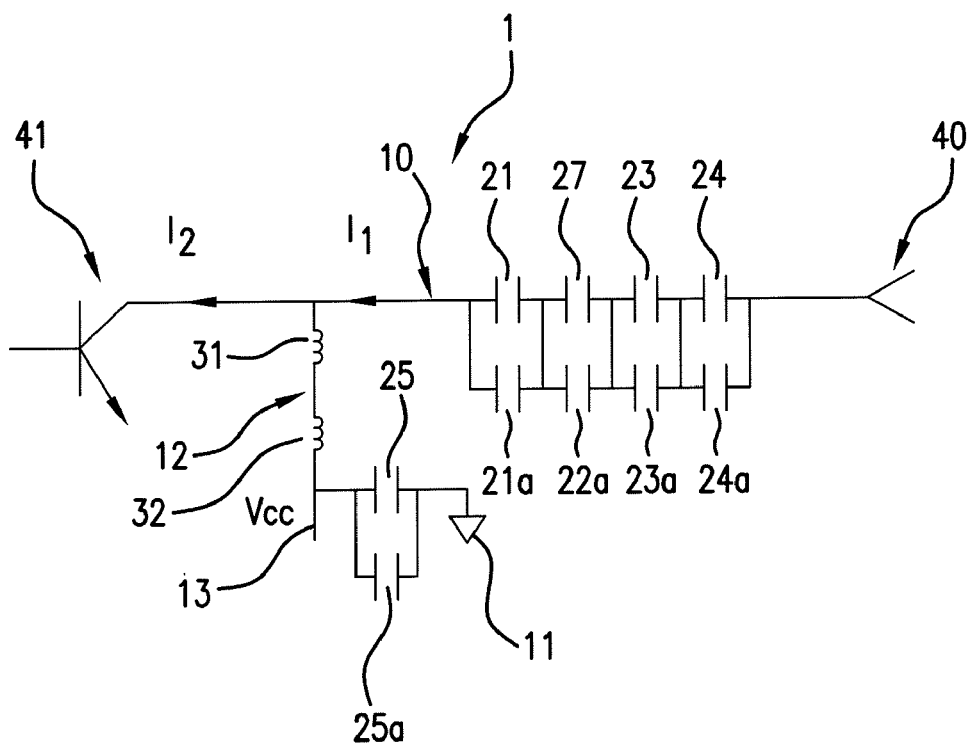
FIG. 7 shows a second embodiment of the surge protection circuit of the PON transceiver of the present invention.
Figure 8:
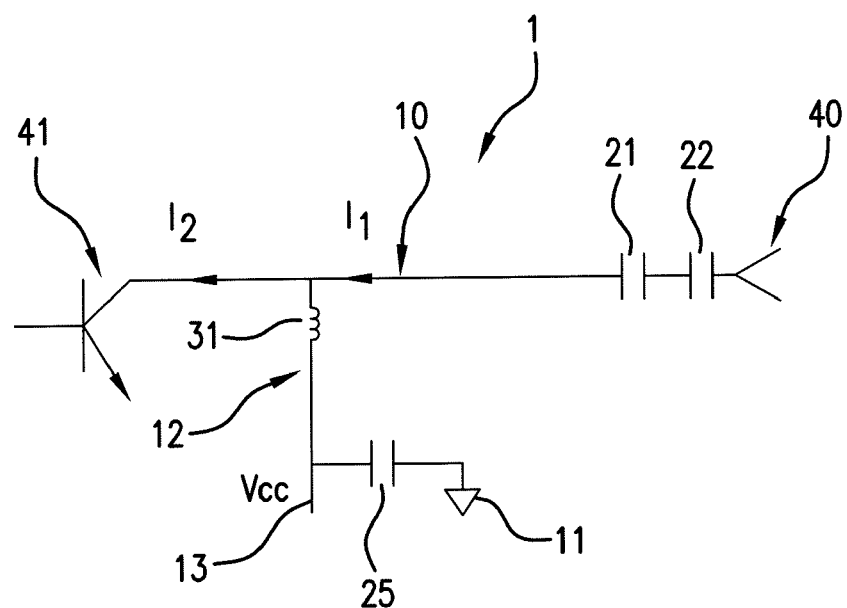
FIG. 8 shows a third embodiment of the surge protection circuit of the PON transceiver of the present invention.
Figure 9:
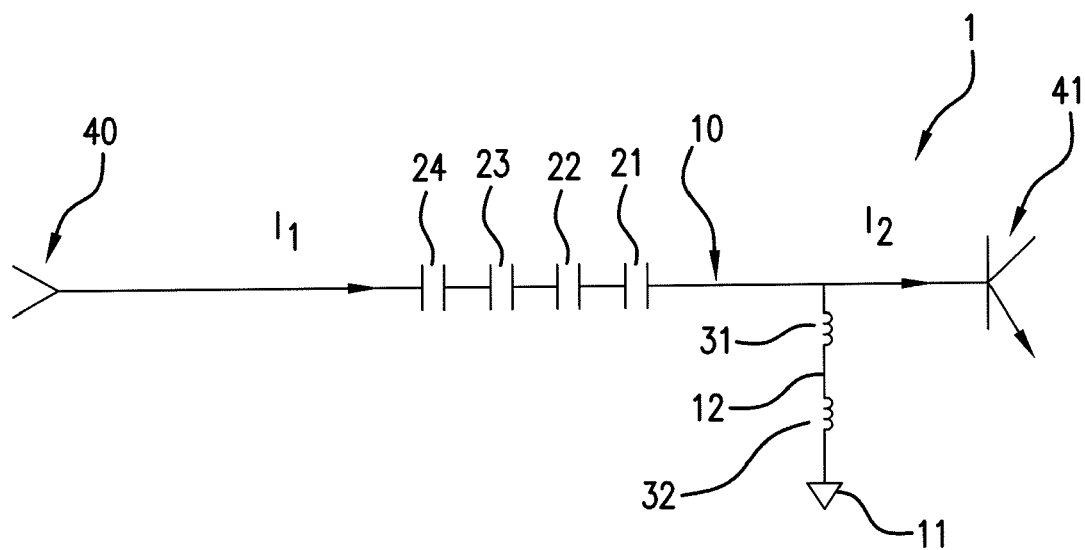
FIG. 9 shows a fourth embodiment of the surge protection circuit of the PON transceiver of the present invention.

Particularly, FIGS. 3, 7 and 8 show the surge protection circuit 1 connected to an RF output port 40, whereas FIG. 9 shows the surge protection circuit 1 connected to an RF input port 40.

FIG. 3 shows one embodiment of the surge protection circuit 1 of the PON transceiver 100 according to the present invention, The protection circuit 1 comprises a first line 10 for conducting an RF signal and a surge signal and a ground line 11.

The first line 10 connects the electro-optical circuitry 103 to the RF connection 102, in the FIGS. 3, 7, 8 and 9, the transistor 41 to the RF port 40.

At least one capacitor 20 is provided in the first line 10 and the capacitance value of the at least one capacitor 20 is such as to limit the surge current in the first line 10, and the breakdown voltage of the at least one capacitor 20 is such as to limit the surge voltage between the first line 10 and the ground line 11.

According to one embodiment, the at least one capacitor 20 comprises a plurality of series capacitors 20, the capacitance value of the plurality of series capacitors 20 being such as to limit the surge current in the first line 10, and the breakdown voltage of the plurality of series capacitor 20 being such as to limit the surge voltage between the first line 10 and the ground line 11.

According to the embodiment of FIG. 3, the plurality of series capacitors 20 comprises four capacitors 21-24 connected in series to sustain surge voltage between the first line 10 and the ground line 11.

In particular, the capacitance value and breakdown voltage of the capacitors 21-24 is such as to sustain the voltage occurred by the surge lightning between the first line 10 and the ground line 11, whereby limiting the surge current into the first line 10.

Preferably, all capacitors 21-24 have the same charging performance and have the capacitance as small as possible to limit the surge current into the transistor 41. For example, each of the four capacitors 21-24 might have a capacitance of 1000 pF.

According to one embodiment, the surge protection circuit 1 further comprises a second line 12 connecting the first line 10 to the ground line 11 and at least one inductor 30 provided in the second line 12 for providing a path to ground for the surge signal.

In particular, the inductance value of the at least one inductor 30 is such as to limit the surge voltage between the first line 10 and the ground line 11.

According to one embodiment, the at least one inductor 30 comprises a plurality of series inductors 30 for defining a path to ground for a possible surge signal travelling in the first line 10 and having inductance value such as to limit the surge voltage between the first line 10 and the ground line 11.

According to the embodiment of FIG. 3, the plurality of series inductors 30 comprises two inductors 31, 32 connected in series to sustain surge current and the inductance value of the inductors 31, 32 is such as to sustain current occurred by surge lightning, whereby limiting the surge voltage between the first line 10 and the ground line 11.

Preferably, the inductance value of the series inductors 31, 32 is as small as possible to effectively protect the transistor 41 from the surge voltage. For example, the inductance value of the two inductors 31, 32 might be 680 nH.

According to the embodiment of FIG. 3, the inductors 31, 32 are connected to a DC voltage line 13. In this case, one or more series bypass capacitors, in the example one bypass capacitor 25, are provided in the second line 12 between the series inductors 31, 32 and the ground line 11 to bypass the DC voltage line 13 from the ground line 11.

For example, the capacitance of the bypass capacitor 25 might be 0.01 μF.

The importance of the choice of the capacitor should be stressed. In addition to the capacitance being as small as possible, the capacitor's rating voltage and ESR has to be taken into account when choosing the capacitors value, as well as the limit of breakdown voltage and the thermal stress at surge rate.

The choice of the inductors is also important. The low Q factor may be considered for avoiding secondary surge to the transistor 41 and shall be balanced for thermal stress.

The typical lightning surge waveforms fall into two categories: combination waveform and ring waveform. Of these two waveforms, the combination waveform presents more energy and more destructive strength.

Figure 4:
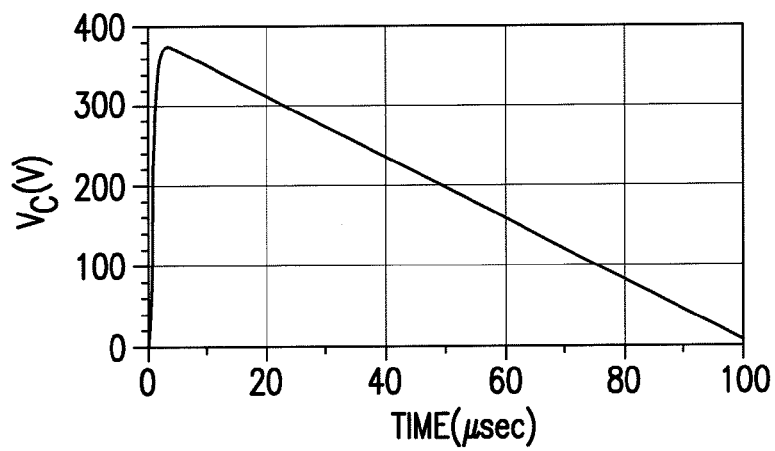
FIG. 4 shows a surge voltage waveform inputted into the surge protection circuit of FIG. 3.
Figure 5:
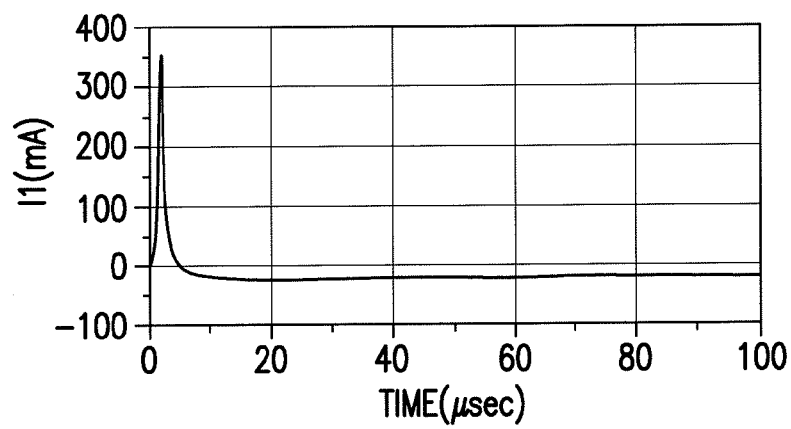
FIG. 5 shows the current flowing through the capacitors of the surge protection circuit of FIG. 3.
Figure 6:
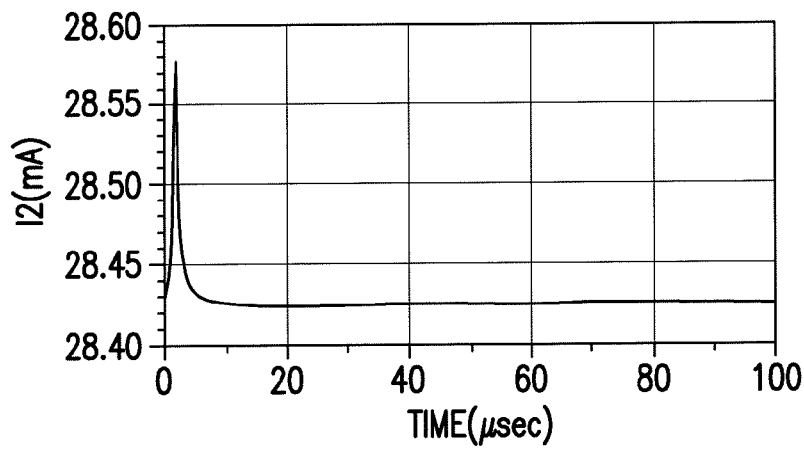
FIG. 6 shows the current flowing into the transistor of FIG. 3.

FIGS. 4, 5 and 6 relate to a simulation performed with the above described surge protection circuit 1, when at the RF port 40 is applied a 1500 V lightning combination waveform.

Specifically, FIG. 4 shows the voltage $V_C$ cross the capacitor 24, FIG. 5 shows the current $I_1$ flowing through the capacitors 21-24 and FIG. 6 shows the current $I_2$ flowing into the transistor 41.

The above surge protection circuit 1 has also been verified. For example, if the capacitance of the four capacitors 21-24 is 1000 pF, the circuit lightning surge is limited to 1.25 kV. If the capacitance falls to 470 pF, the surge voltage increases to 2.3 kV.

FIG. 7 shows a second embodiment of the surge protection circuit 1 of the PON transceiver 100 according to the present invention. According to this embodiment, one or more capacitors are connected in parallel to each of the capacitors 21-24. In FIG. 7, each capacitor 21-24 is connected in parallel to a capacitor 21a-24a. By this way, the surge protection circuit 1 can sustain more surge current.

Moreover, one or more capacitors are connected in parallel to each of the bypass capacitors. In FIG. 7, one capacitor 25a is connected in parallel to the bypass capacitor 25. Using one or more capacitors in parallel to the bypass capacitor 25 not only allows the surge protection circuit to sustain more surge current but also prevents undesirable open-circuit between the ground line 11 and the DC voltage line 13 in case of damage of the capacitor 25.

FIG. 8 shows a surge protection circuit 1 having a lower number of capacitors and inductors, with higher rating.

FIG. 9 shows a surge protection circuit 1 at an input RF port 40, having four series capacitors 21-24 in the first line 10, two series inductors 31, 32 in the second line 12 for defining a path to the ground line 11 for a possible surge signal travelling in the first line 10.

From the discussion above, it should be clear to those skilled in the art that the present invention provides a PON transceiver with a surge protection circuit which effectively protects the electro-optical circuitry included into the PON transceiver.

While the invention has been described with reference to preferred embodiments, the description is illustrative of the invention and is not to be construed as limiting the invention. Various modifications and applications may occur to those skilled in the art without departing from the scope of the invention as defined by the appended claims.

The invention claimed is:

1. A passive optical network transceiver comprising:
   an optical connection for optical signals,
   an RF connection for RF signals,
   an electro-optical circuitry connected to said optical connection, and
   a surge protection circuit connecting said electro-optical circuitry to said RF connection for protecting said electro-optical circuitry, wherein
   said surge protection circuit comprises:
   a first line for conducting an RF signal and a surge signal, said first line being connecting said electro-optical circuitry to said RF connection,
   a ground line,
   at least one capacitor provided in said first line, wherein the capacitance value of said at least one capacitor is such as to limit the surge current in said first line, and the breakdown voltage of said at least one capacitor is such as to limit the surge voltage between said first line and said ground line.

2. A passive optical network transceiver according to claim 1, wherein said at least one capacitor comprises a plurality of series capacitors, the capacitance value of said plurality of series capacitors being such as to limit the surge current in said first line, and the breakdown voltage of said plurality of series capacitors being such as to limit the surge voltage between said first line and said ground line.

3. A passive optical network transceiver according to claim 2, wherein all capacitors of the plurality of capacitors having capacitance as small as possible to limit the surge current into said first line breakdown voltage such as to limit the surge voltage between said first line and said ground line.

4. A passive optical network transceiver according to claim 1, wherein said surge protection circuit further comprises:
   a second line connecting said first line to said ground line,
   at least one inductor provided in said second line for providing a path to ground for the surge signal,
   wherein
   the inductance value of said at least one inductor is such as to limit the surge voltage between said first line and said ground line.

5. A passive optical network transceiver according to claim 4, wherein said at least one inductor comprises a plurality of series inductors, the inductance value of said plurality of inductors being such as to limit the surge voltage between said first line and said ground line.

6. A passive optical network transceiver according to claim 5, wherein the inductance value of the plurality of series inductors being as small as possible to limit surge voltage between said first line and said ground line.

7. A passive optical network transceiver according to claim 6, wherein said plurality of series inductors is connected to a DC voltage line, one or more series bypass capacitors being provided in said second line between said plurality of series inductors and said ground line to bypass said DC voltage line from said ground line.

8. A passive optical network transceiver according to claim 7, wherein said surge protection circuit further comprises one or more capacitors connected in parallel to each of said one or more series bypass capacitors.

9. A passive optical network transceiver according to claim 1, wherein said surge protection circuit further comprises one or more capacitors connected in parallel to each of said at least one capacitor.

10. A passive optical network transceiver according to claim 1, wherein said electro-optical circuitry comprises an optical triplexer for transmitting and receiving video, voice and data content.

11. A passive optical network transceiver according to claim 10, wherein said optical triplexer comprises:
    an optical transmitter for transmitting an up stream optical signal at a first wavelength,
    an optical receiver for receiving a down stream optical signal at a second wavelength, and
    an optical receiver for receiving a video optical signal at a third wavelength.

12. A passive optical network transceiver according to claim 11, wherein
    said up stream optical transmitter comprises a DFB laser,
    said down stream optical receiver comprises a photodiode, and
    said video optical receiver comprises a photodiode.

13. A passive optical network transceiver according to claim 11 or 12, wherein
    said first wavelength is 1310 nm,
    said second wavelength is 1490 nm, and
    said third wavelength is 1550 nm.

* * * * *